United States Patent
Das et al.

(10) Patent No.: US 9,894,547 B2
(45) Date of Patent: Feb. 13, 2018

(54) DYNAMIC UPDATE OF UE CAPABILITY FOR INTER-FREQUENCY AND INTER-RAT MEASUREMENTS

(71) Applicant: QUALCOMM Incorporated, San Diego, CA (US)

(72) Inventors: Soumya Das, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 14/265,180

(22) Filed: Apr. 29, 2014

(65) Prior Publication Data
US 2015/0312787 A1    Oct. 29, 2015

(51) Int. Cl.
| | |
|---|---|
| *H04W 4/00* | (2009.01) |
| *H04W 24/10* | (2009.01) |
| *H04W 36/00* | (2009.01) |
| *H04W 8/24* | (2009.01) |

(52) U.S. Cl.
CPC ............ *H04W 24/10* (2013.01); *H04W 8/24* (2013.01); *H04W 36/0033* (2013.01)

(58) Field of Classification Search
None
See application file for complete search history.

(56) References Cited

U.S. PATENT DOCUMENTS

| | | | |
|---|---|---|---|
| 7,512,401 B2 | 3/2009 | Muhonen et al. | |
| 2005/0107100 A1 | 5/2005 | Gustafsson et al. | |
| 2010/0034094 A1* | 2/2010 | Tenny | H04W 8/22 370/241 |
| 2010/0113055 A1* | 5/2010 | Iwamura | H04W 72/085 455/452.1 |

(Continued)

FOREIGN PATENT DOCUMENTS

| | | |
|---|---|---|
| EP | 2242300 A1 | 10/2010 |
| GB | 2497579 A | 6/2013 |

(Continued)

OTHER PUBLICATIONS

3GPP TSG-RAN WG 2 , R2-071211 Title: Framework for UE capability handling in LTE: Mar. 26-30, 2007.*

(Continued)

*Primary Examiner* — Chi H Pham
*Assistant Examiner* — Fahmida Chowdhury
(74) *Attorney, Agent, or Firm* — Nerrie M. Zohn

(57) ABSTRACT

A user equipment (UE) provides a capability-type indication for each of one or more UE capabilities. Each indication corresponds to a capability type, the type being one of a persistent capability or a second-type capability. Information corresponding to the capability-type indication may be provided to an eNB associated with the UE by RRC signaling. The UE provides a capability-change indication for each of one or more UE capabilities that has changed capability type. Information corresponding to the capability-change indication may be provided to an eNB by lower layer (Continued)

signaling, RRC signaling, or a combination thereof. Capability change information may be sent to the eNB autonomously by the UE, or in response to an inquiry from the eNB. The inquiry from the eNB may be triggered by the UE.

34 Claims, 14 Drawing Sheets

(56) References Cited

U.S. PATENT DOCUMENTS

| | | | |
|---|---|---|---|
| 2010/0118836 A1 | 5/2010 | Kazmi et al. | |
| 2011/0051711 A1 | 3/2011 | Kishiyama et al. | |
| 2012/0040687 A1* | 2/2012 | Siomina | G01S 5/0205 455/456.1 |
| 2012/0083221 A1 | 4/2012 | Ranta-Aho et al. | |
| 2012/0113866 A1* | 5/2012 | Tenny | H04W 24/10 370/254 |
| 2013/0039232 A1* | 2/2013 | Kim | H04W 8/22 370/280 |
| 2013/0308481 A1* | 11/2013 | Kazmi | H04W 48/16 370/252 |
| 2013/0329665 A1 | 12/2013 | Kadous et al. | |
| 2014/0219248 A1* | 8/2014 | Reddiboyana | H04W 76/025 370/331 |
| 2016/0262144 A1* | 9/2016 | Kitazoe | H04L 5/0057 |

FOREIGN PATENT DOCUMENTS

| | | |
|---|---|---|
| WO | WO2011028481 | 3/2011 |
| WO | 2013063793 A1 | 5/2013 |

OTHER PUBLICATIONS

3GPP TSG-RAN WG 2, R2-071211, Source: Qualcomm :Title: Framework for UE capability handling in LTE: Mar. 26-30, 2007.*
NPL 3GPP TSG-RAN WG 2, R2-071211,Title: Framework for UE capability handling in LTE: Mar. 26-30, 2007).*
International Search Report and Written Opinion—PCT/US2015/027817—ISA/EPO—dated Jul. 17, 2015.
Qualcomm Europe, "Framework for UE capability handling in LTE", 3GPP TSG-RAN WG2 Meeting #57-bis; R2-071211, 3rd Generation Partnership Project (3GPP), Mobilecompetence Centre ; 650, Route Des Lucioles ; F-06921 Sophia-Antipolis Cedex; France, vol. RAN WG2, no. St. Julian, Mar. 22, 2007, XP050134183, 7 Pages.
Qualcomm Europe: "Change of UE capability", R2-075544, 3GPP TSG RAN WG 2 LTE RRC ad-hoc, Dec. 13-14, 2007, pp. 4.
Second Written Opinion from International Application No. PCT/US2015/027817, dated Mar. 22, 2016, 9 pp.

* cited by examiner

DYNAMIC UPDATE OF UE CAPABILITY FOR INTER-FREQUENCY AND INTER-RAT MEASUREMENTS

BACKGROUND

Field

The present disclosure relates generally to communication systems, and more particularly, to dynamic update of user equipment (UE) capability for a given radio access technology (RAT), e.g., capability for inter-frequency and inter-RAT measurements.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

An apparatus, e.g., user equipment (UE), provides a capability-type indication for each of one or more UE capabilities. Each indication corresponds to a capability type, the type being one of a first-type, e.g., non-persistent, capability or a second-type, e.g., persistent, capability. Information corresponding to the capability-type indication may be provided to an eNB associated with the UE by RRC signaling. The UE provides a capability-change indication for each of one or more UE capabilities that has changed capability type. Information corresponding to the capability-change indication may be provided to an eNB by lower layer signaling, RRC signaling, or a combination thereof. If RRC signaling is used, entire capability information—including information on capabilities that have changed and capabilities that have not changed—may be sent. Alternatively, only information on capabilities that have changed may be sent. If lower layer signaling is used, only the updated capability may be sent. Capability change information may be sent autonomously by the UE, or in response to an inquiry from an eNB. Capability change information may be sent autonomously by the UE, or in response to an inquiry from an eNB. The inquiry from the eNB may be triggered by the UE.

An apparatus, e.g., user equipment (UE), may provide a capability-change indication for each of one or more UE capabilities that has changed from a first-type capability to a second-type capability, wherein the second-type capability is different from the first-type capability. Each of the one or more UE capabilities may have an associated default value, the capability-change indication may be provided to a first serving eNB, and upon handover to a second serving eNB, the UE changes each of the one or more UE capabilities back to its associated default value. The UE may also, upon handover, provide information to the second serving eNB corresponding to the one or more UE capabilities. Such information may include the capability type, e.g., persistent or non-persistent, and the default state for such capability.

The UE capability update mechanism benefits multi-SIM devices, wherein the need for measurement gaps (inter-frequency or inter-RAT) is determined by the availability or unavailability of a receive chain that does the measurements on the corresponding frequency and RAT. When two or more SIMS/subscriptions are in active call, the UE will need gaps. When only one SIM/subscription is in active call, the UE does not need gaps as the unused receive chain (it may be in WWAN idle state) may be used inter-frequency/inter-RAT measurements.

DETAILED DESCRIPTION

Figure 1:
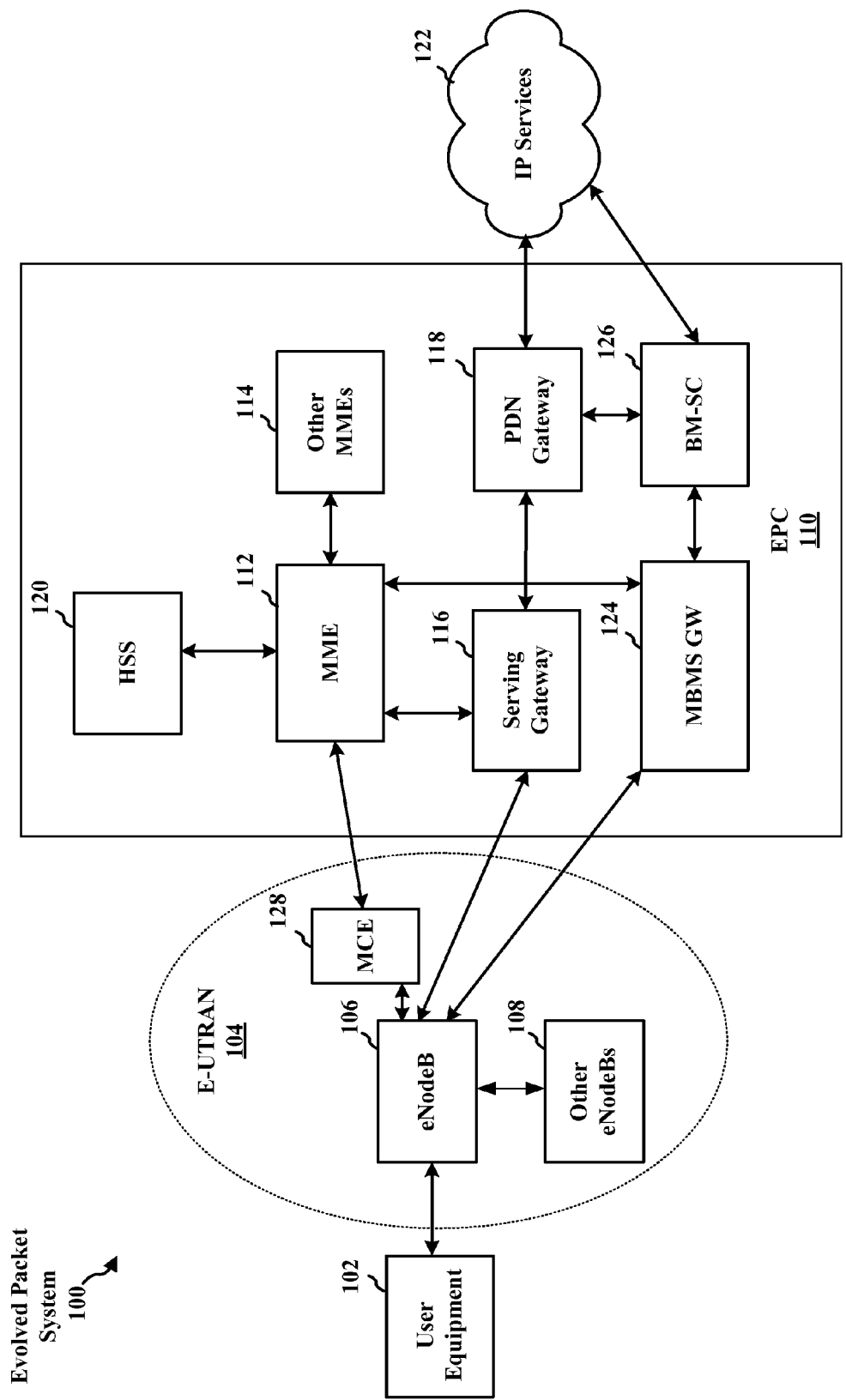
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
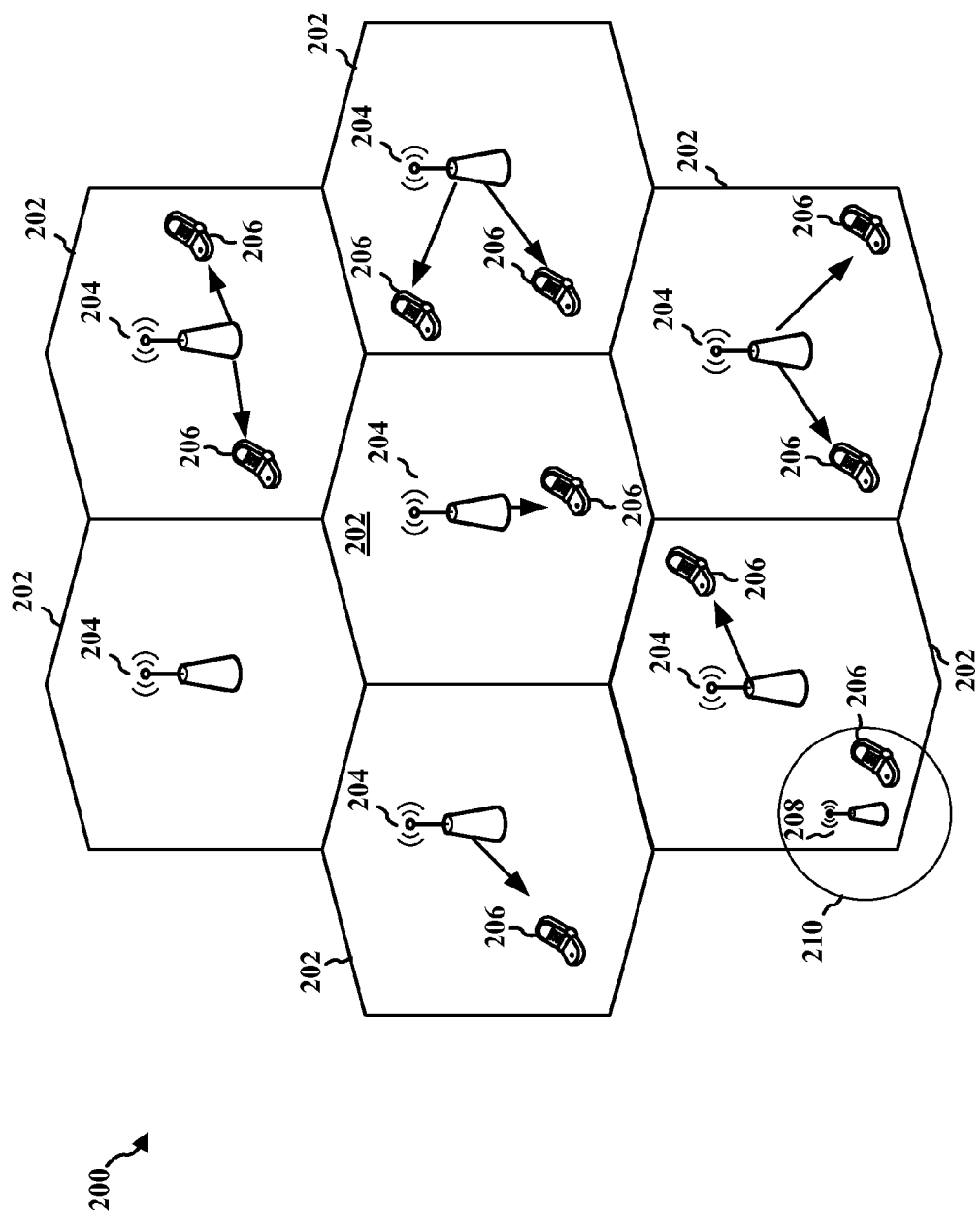
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
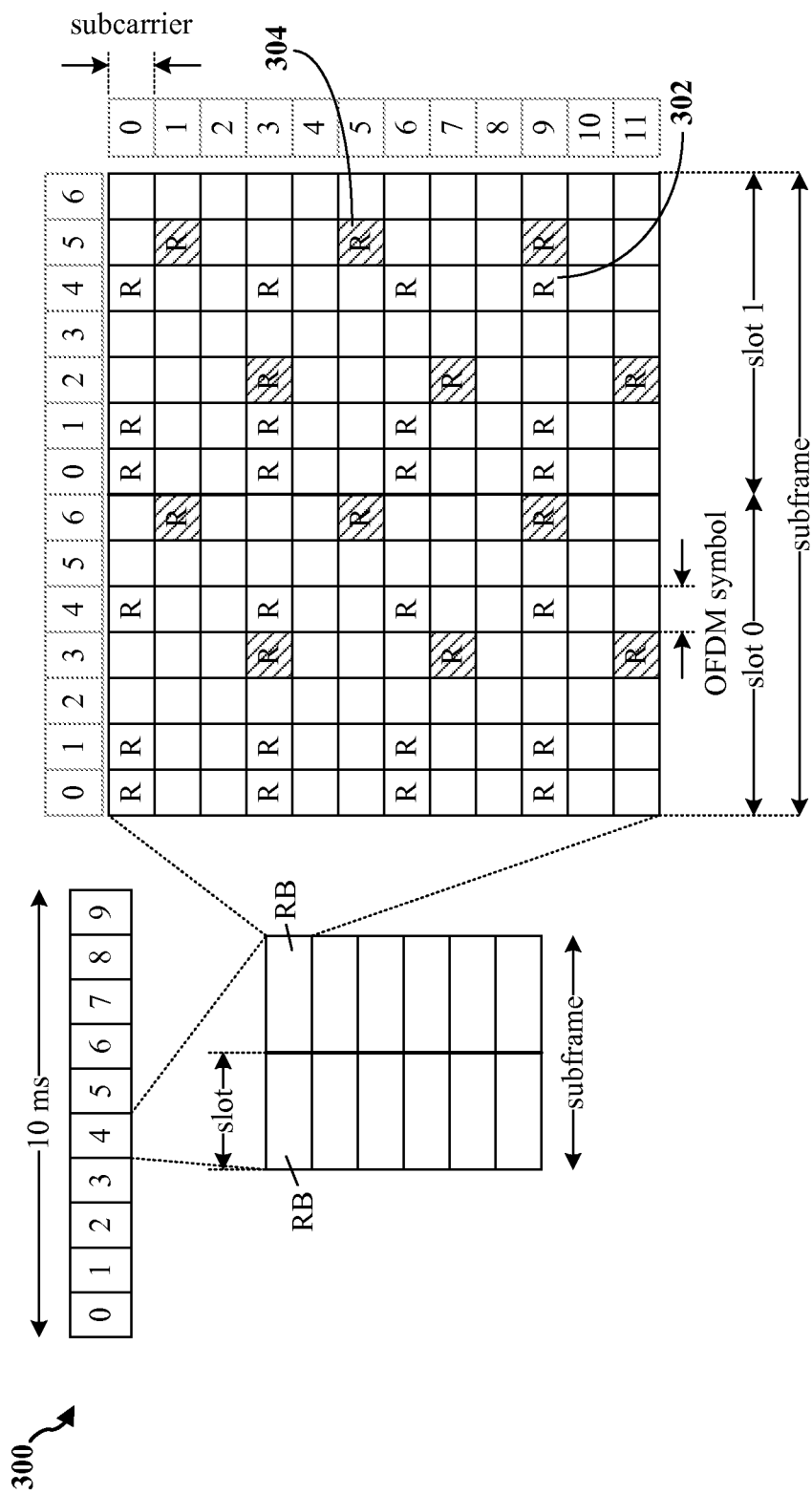
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
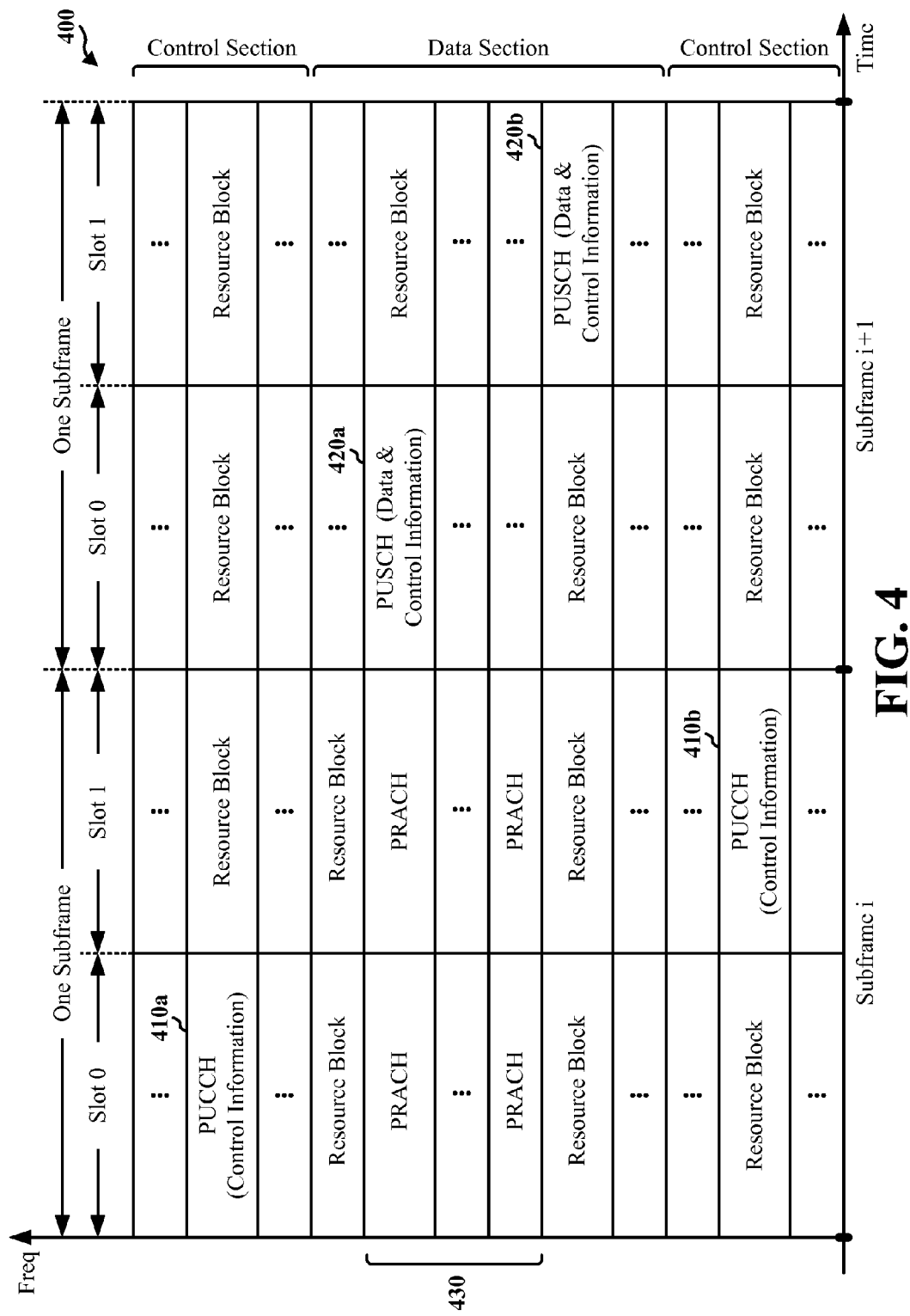
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
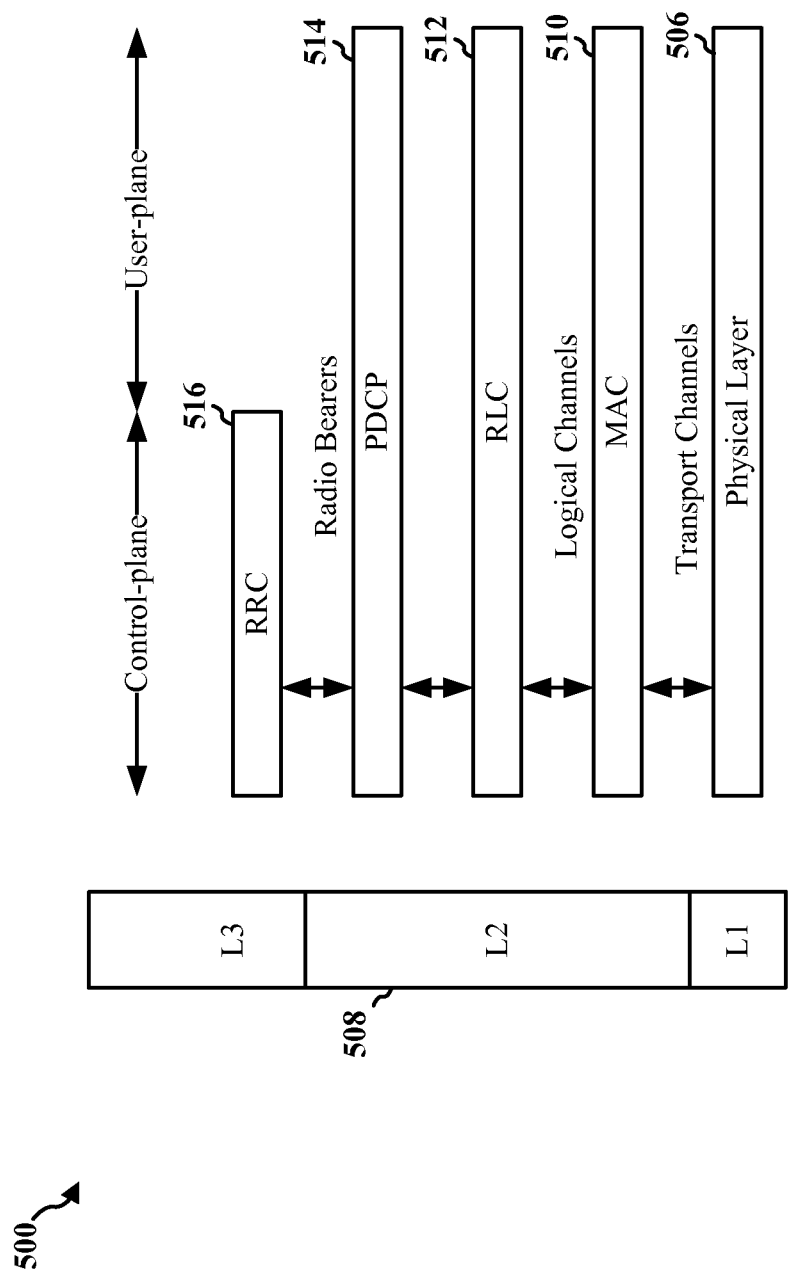
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
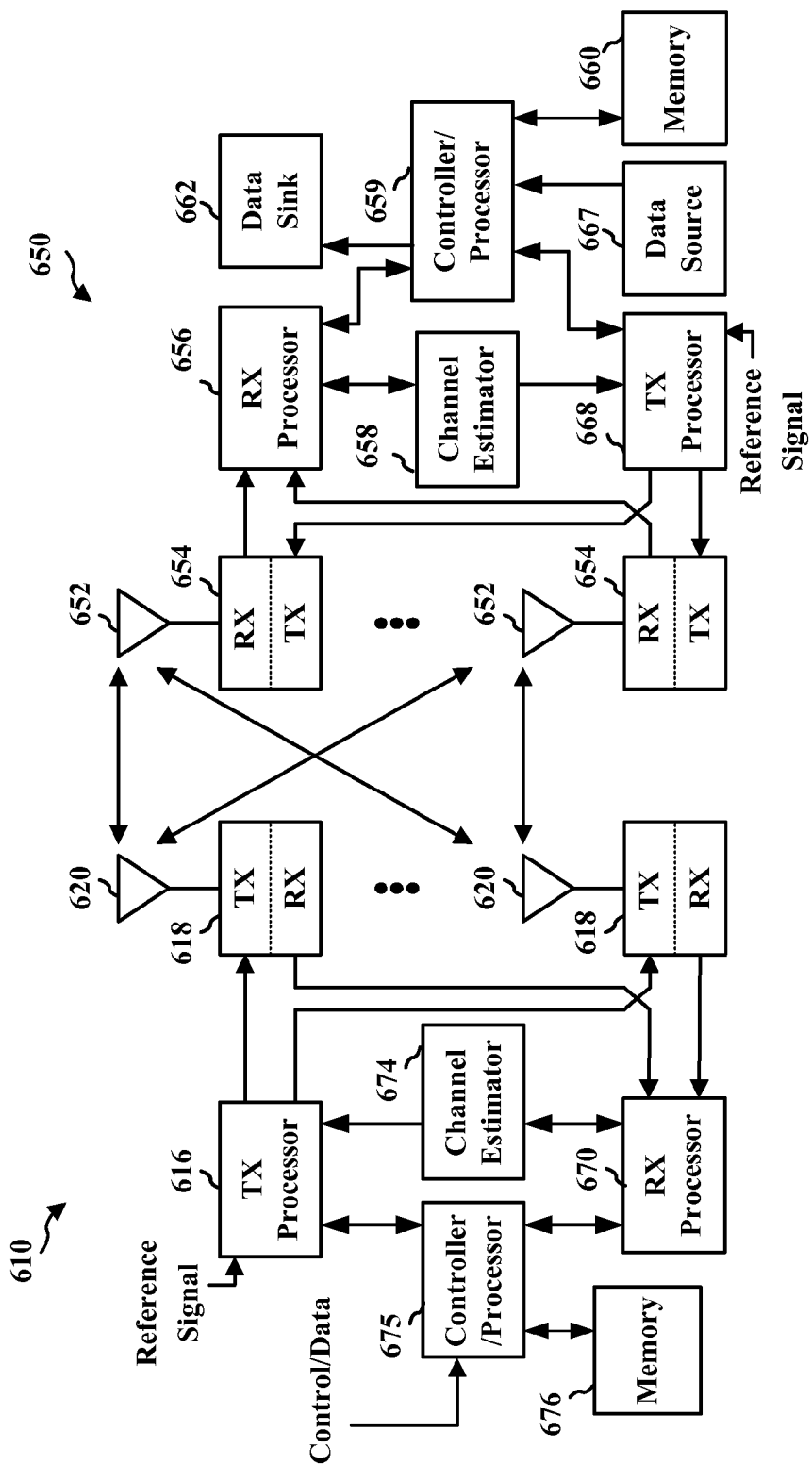
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In 3GPP networks, the UE capability is needed to be known by the serving eNB and the Core Network so that best use of the radio capabilities of UE and network with respect to different features can be made. One such example is the UE radio access capability regarding inter-frequency and inter-RAT measurements as the network scheduler needs to know whether measurement gaps are required by the UE for those measurements. A UE advertises its radio access capabilities to core network elements using UE capability Information Elements. For example, in LTE, UE-EUTRA capability lists the E-UTRA radio capability of UE including its capability to do inter-frequency and inter-RAT measurements with or without measurement gaps for different bands or band combinations. interFreqNeedForGaps and interRATNeedForGaps are UE capability information elements. interFreqNeedForGaps indicates a need for measurement gaps when operating on the E-UTRA band given by the entry in bandListEUTRA or on the E-UTRA band combination given by the entry in bandCombinationListEUTRA and measuring on the E-UTRA band given by the entry in interFreqBandList. interRATNeedForGaps indicates a need for downlink and uplink measurement gaps when operating on the E-UTRA band given by the entry in bandListEUTRA or on the E-UTRA band combination given by the entry in bandCombinationListEUTRA and measuring on the inter-RAT band given by the entry in the interRAT-BandList. A value of 1 means gaps are needed while a value of 0 means gaps are not needed. The UE capability information is stored in the core network, e.g., MME, and is provided to the eNB during initial UE context setup over the S1 interface.

Changes in UE capabilities are assumed infrequent. As such the UE capability information is considered static. However, in instances where there is a change in UE capability, the process of informing the network of capability changes involves significant network resources and is high in overhead. For example, if a UE initially advertises a measurement capability indicating no need for gaps for inter-frequency and inter-RAT measurements for some or all bands and band combinations, and that measurement capability changes, the UE needs to update interFreqNeedForGaps and interRAT-NeedForGaps. For example, a UE may be using another receive chain e.g. the WLAN receive chain for doing the inter-frequency and inter-RAT measurements. Therefore the UE does not need gaps for those measurements and indicated need for gaps accordingly using the interFrequencyNeedForGaps and interRATNeedForGaps. When the WLAN receive chain previously available for inter-frequency and inter-RAT cell search and measurements becomes unavailable, the UE needs to update information elements interFreqNeedForGaps and interRAT-NeedForGaps. The capability may also be dependent on the antenna configuration for Wi-Fi and whether antenna is shared between Wi-Fi and Bluetooth. In order to update these information elements, the UE is required to tear down a current RRC connection with the eNB and initiate a new RRC connection by requesting higher layers to initiate NAS procedures to update UE radio access capabilities using the new RRC connection. These NAS procedures include the UE detaching from the core network, re-attaching to the core network, indicating "UE radio capability update."

It is desirable to provide for dynamic update of UE capability information in an efficient manner that does not necessarily involve core network elements and the associated high overhead of tearing down RRC connection and sending the updated capability using the new RCC connection. Disclosed herein is a method of wireless communication wherein a UE may provide a capability-type indication that indicates the UE has at least one capability that may change dynamically. A "dynamic" change, in this regard, corresponds to a capability change that does not necessarily involve core network elements and tearing down and creating RRC connections. Once the capability-type of the UE is communicated, the UE may provide a capability-change indication that indicates the capability of the UE has changed.

As used herein a "persistent" UE capability refers to a UE capability that is not expected to change in a dynamic fashion, for example, by default all 3GPP capabilities are of a persistent type. Thus, while a persistent capability may change, such change takes place in non-dynamic fashion by involving core network elements and tearing down and creating RRC connections. For example, in the case of need for measurement gaps, a UE capability for measurement gaps is considered persistent when the need for measurement gaps by the UE remains constant. A persistent UE capability may be indicated through RRC signaling. It is to be noted that currently all radio access capabilities in 3GPP are considered persistent as current 3GPP standards do not contemplate the existence of non-persistent capabilities. As used herein a "non-persistent" UE capability refers to a UE capability that is not always present but becomes available sometimes. For example, in the case of need for measurement gaps, a UE capability for measurement gaps is considered non-persistent when the need for measurement gaps by the UE does not remain constant. For example, in a case where a WLAN receive chain of a UE may be used to capture WWAN signals, the UE capability with respect to measurement gaps may change from a need for measurement gaps to a no need for measurement gaps, depending on the availability of the WLAN receive chain.

Figure 7:
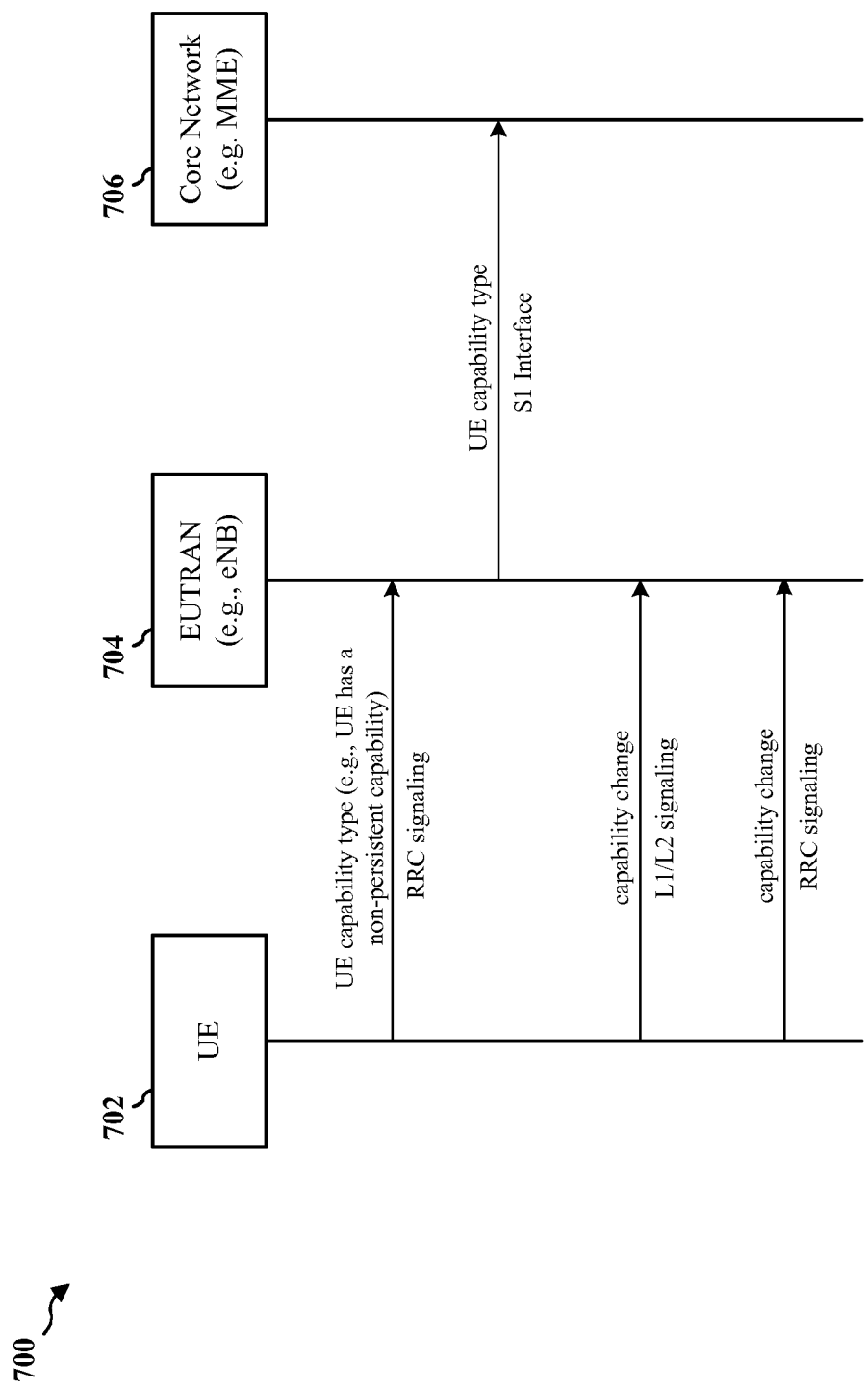
FIG. 7 is a call flow diagram of a mechanism for conveying non-persistent UE capability.

FIG. 7 is a call flow diagram 700 of a mechanism for conveying changes in UE capability. A UE may have capabilities that may be characterized as being of a particular type, e.g., a first-type or a second-type. For example, as described above, a UE capability may be either a first-type, e.g., persistent capability, or a second-type, e.g., non-persistent capability. As a first step, a UE 702 provides an indication of whether the UE has at least one capability that is a second-type, e.g., non-persistent, capability. The capability-type indication may be provided to the EUTRAN 704, e.g., eNB, by sending information to the eNB. The information may be sent through an over-the-air interface by, for example, RRC signaling.

The UE may provide the capability-type indication to the eNB using a flag included in an information element. For example, an information element tree including a number of information element branches may include a flag in an information element branch corresponding to UE capability-type. The flag may indicate whether the UE has first-type, e.g., non-persistent, capability or second-type, e.g., persistent, capability. Alternatively, in order to reduce overhead, the flag may indicate whether the UE is more likely or less likely to have a particular capability type. For example, the flag may indicate whether the UE is more likely or less likely to have a non-persistent capability.

In one configuration, both first-type and second-type capability-type indications are sent using the same nested information element. In this case, a capability is indicated as a first-type by including an additional flag in the information element corresponding to that capability. In the absence of an additional flag in the information element, the capability-type for that particular capability defaults to a second-type capability. In another configuration, first-type capability-type indications are sent using an information element, and second-type capability-type indications are sent using a different information element.

The capability-type indication may further be provided by the eNB to the core network 706 from the EUTRAN over the S1 interface via non access stratum (NAS) messages. In this case, the eNB does not look into the NAS messages and just transfers them to the core network. The core network subsequently provides the capability-type information to the appropriate eNB. This is beneficial in that the information may be provided to different eNBs as the UE changes locations.

In one embodiment, default UE capabilities and corresponding types are stored in the Core Network. The Core Network may provide the capabilities and corresponding types to the appropriate eNB when the serving eNB of the UE changes. However, if a first-type, e.g., non-persistent, capability of the UE has changed, that is only known to the eNB and not the MME. Thus the capability state change may be only within the scope of the current RRC connection between the UE and the serving eNB. The capability state change, however, may not be transferred from the current serving eNB to another serving eNB as part of UE context transfer when the serving eNB changes. In the case of a serving eNB change, only default first-type, e.g., non-persistent, capability is transferred, and that transfer is from the UE to the new serving eNB. Accordingly, the new eNB has the default state of the first-type, e.g., non-persistent, capability. The UE would indicate the first-type, e.g., non-persistent, capability to the new eNB using the new RRC connection.

As a second step in the mechanism, the UE 702 provides an indication to the EUTRAN 704, e.g., eNB, of a change or update in UE capability. The capability-change indication may be provided to the EUTRAN 704, e.g., eNB, by sending information to the eNB. The information may be sent through lower layer signaling, such as L1 or L2 signaling. In this step, higher layer RRC signaling is not used. The information may be mapped to a PUCCH or PUSCH and may be included as part of HARQ, ACK/NACK, CQI, RI, PMI signaling or via medium access control (MAC) control elements (CE).

In a case where the UE capability corresponds to one of two states, the capability-change indication may be implemented by a toggle indication. For example, if the UE capability relates to measurement gaps, and the two capability states are 1) a need for measurement gaps, and 2) no need for measurement gaps, the capability-change indication may be provided by information, e.g., a bit, set to a first value 1 for state 1) a need for measurement gaps, and a second value 0 for state 2) no need for measurement gaps.

In a case where the UE capability corresponds to either an "on" or "off" condition, the capability-change indication may be implemented by an activate/deactivate indication. For example, if the UE capability relates to MIMO capability of the UE, the capability-change indication may be provided by information, e.g., a bit, set to a first value 0 for "on" and a second value 1 for "off". For example, if a WLAN receive chain of a UE can act as a full fledged LTE (WWAN) receive chain, the UE's MIMO capability can change depending on the availability of the WLAN receive chain.

In current UE capability update mechanisms, a change in a UE capability involves signaling of an information element tree by RRC signaling that may include a number of information element branches unrelated to the changed UE capability. For example, the information element tree may include information elements related to persistent capabilities of the UE and to unchanged non-persistent capabilities. In this case, the entire information element tree is signaled even though only a single UE capability has changed. This is inefficient use of network overhead. In accordance with the mechanism disclosed herein, the lower layer signaling includes only information relevant to the UE capabilities that have changed. In the absence of first-type and second-type UE capability-type indication (as in current 3GPP specifications), a UE capability change or update indication may be for a subset of UE capabilities with the UE and network predefining which UE capability changes update is being signaled by L1/L2 signaling As just described, as a second step in the two-step mechanism, the UE 702 may provide a capability-change indication to the EUTRAN 704, e.g., eNB, through lower layer signaling, such as L1 or L2 signaling. In another implementation, the UE 702 may provide capability-change indication to the EUTRAN 704, e.g., eNB, through RRC signaling.

The UE may provide the capability-change indication to the eNB using a flag included in an information element sent through RRC signaling. For example, in a configuration, an information element tree including a number of information element branches may include a flag in the information element branch corresponding to the first-type, e.g., non-persistent, capability that has changed. In a further configuration, the remaining information element branches in the information element tree, which have not changed, are not duplicated. In this case, only changes, or delta updates, are sent. This reduces the size of messages and is distinct from current processes in which an update in any UE capability requires messaging that includes information on each UE capability, regardless of whether that capability has changed.

Figure 8:
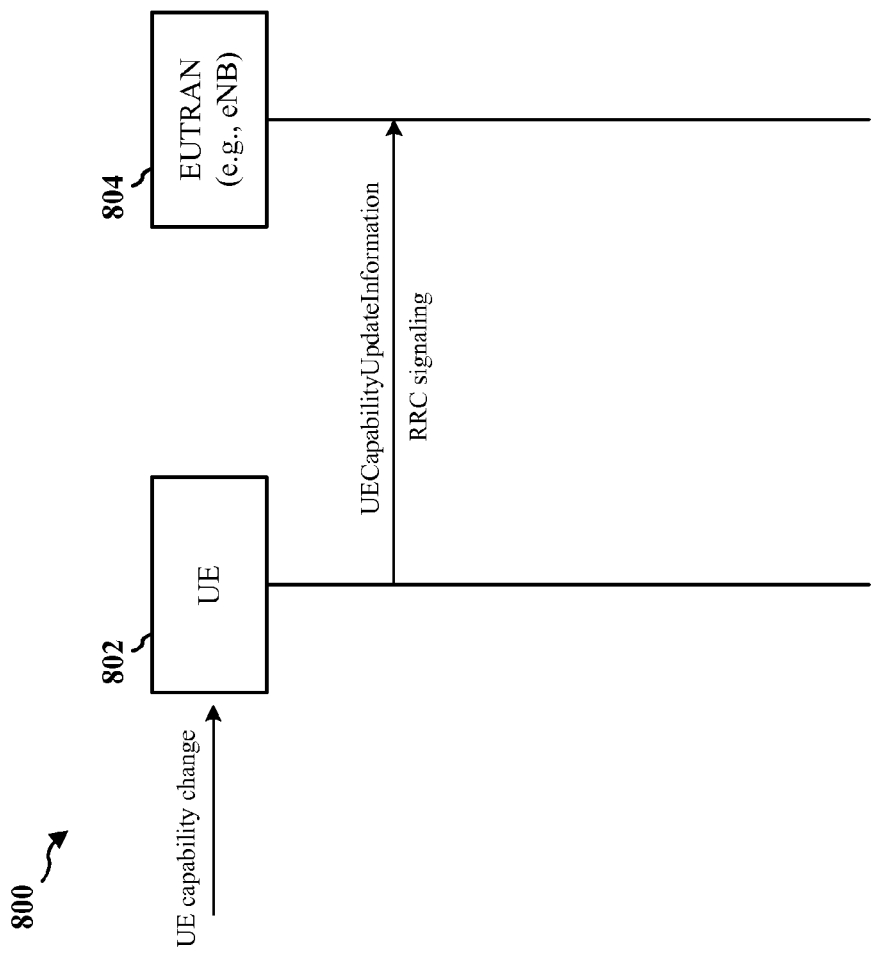
FIG. 8 is a call flow diagram of one implementation of providing UE capability update information.

FIG. 8 is a call flow diagram 800 of one implementation of providing UE capability update information. In this implementation, the UE 802 autonomously initiates a UE capability change/update procedure. The UE may initiate the procedure in response to a trigger event. A trigger event may correspond to a change in UE capability. For example, in a UE having two receive chains, e.g., corresponding to a WWAN modem and a WLAN modem. The WLAN modem may be used for inter-frequency measurements thus obviating the need for measurement gaps by the WWAN. If, however, the WLAN modem becomes unavailable, the UE capability would change to a need for measurement gaps so the WWAN modem may perform inter-frequency measurements. The UE 802 initiates the UE capability update procedure on its own without RRC connection tear down. The UE provides a capability-change indication (e.g., UECapabilityUpdateInformation) to the EUTRAN using RRC signaling instead of lower layer signaling.

Figure 9:
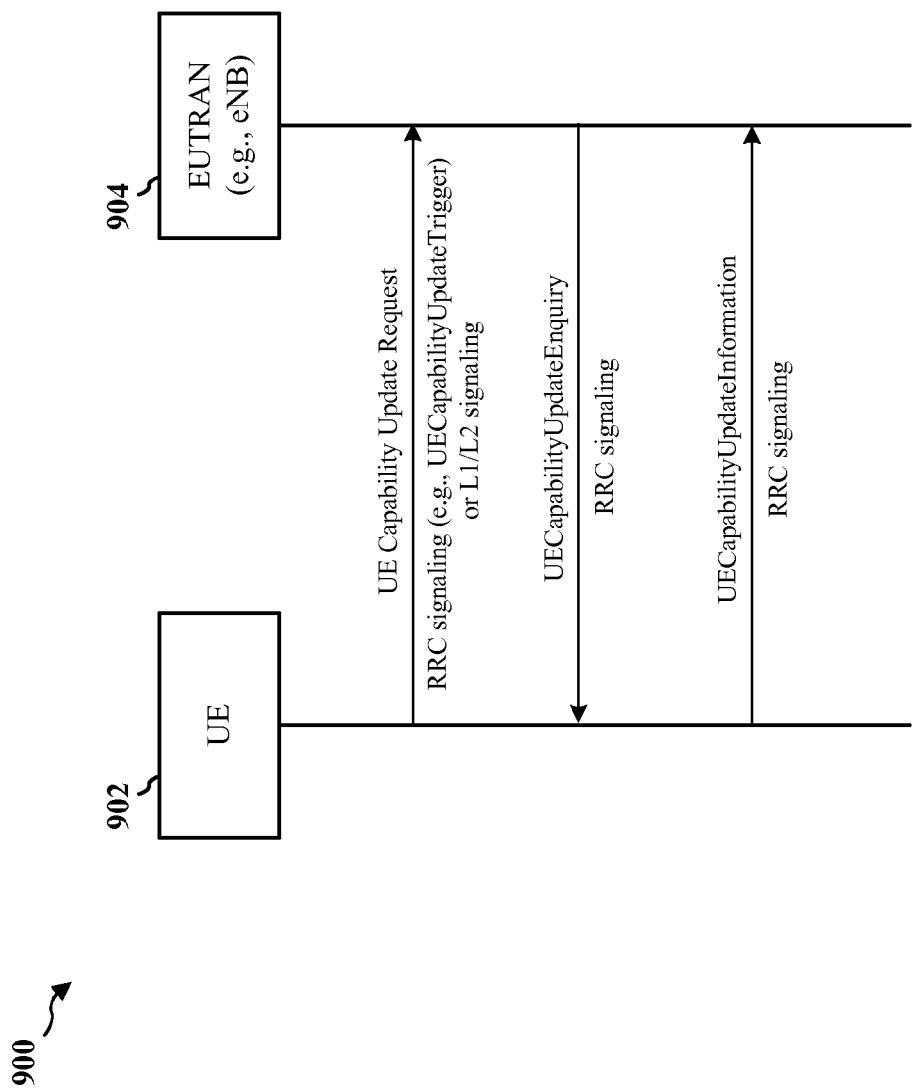
FIG. 9 is a call flow diagram of another implementation of providing UE capability update information.

FIG. 9 is a call flow diagram 900 of one implementation of providing UE capability update information. In this implementation, the UE 902 may initiate a UE capability change/update by requesting the EUTRAN 904, e.g., eNB, to start a UE capability inquiry procedure. To this end, the UE may send a UE capability update trigger request (e.g.) to the eNB 904. The request may be sent by the UE 902 through RRC signaling (e.g., UECapabilityUpdateTrigger) or using lower layer, L1/L2, signaling. In response to this request the eNB 904 sends a request (e.g., UECapabilityUpdateEnquiry) for a UE capability update. This request may be sent using RRC signaling. In response to the update request from the eNB 904, the UE 902 provides a capability-change indication (e.g., UECapabilityUpdateInformation) to the EUTRAN 904. This request may be sent using RRC signaling instead of lower layer signaling.

Figure 10:
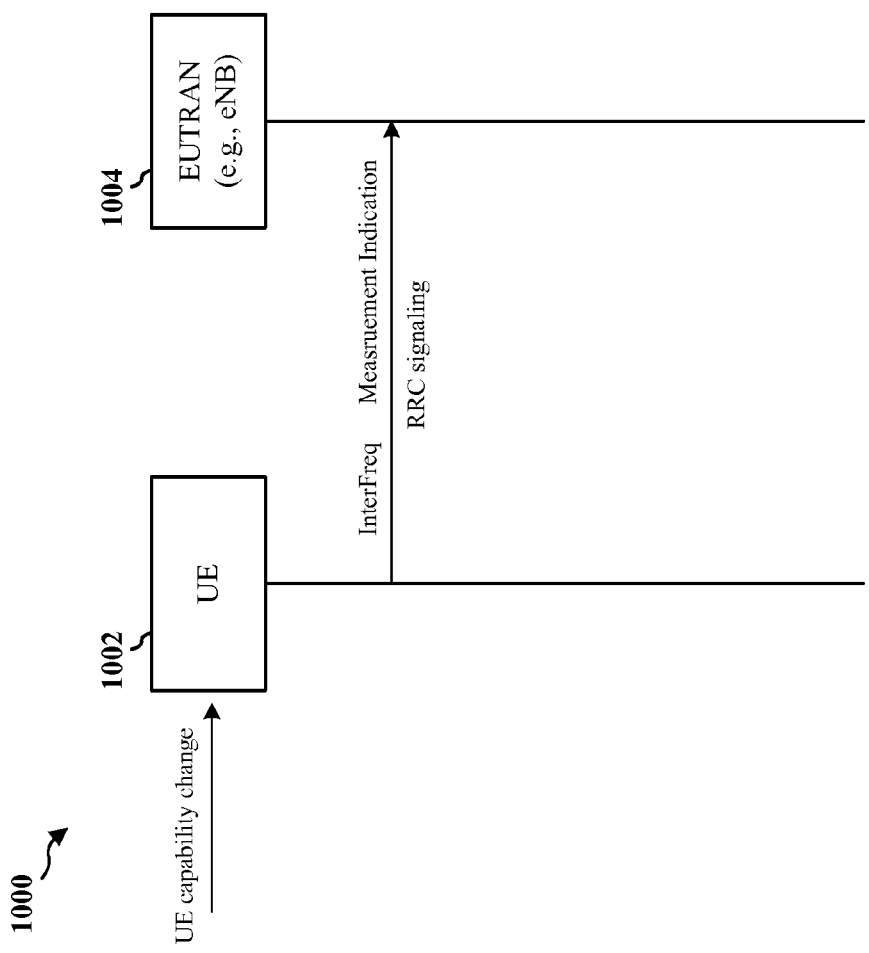
FIG. 10 is a call flow diagram of one implementation of providing UE capability update information involving a UE capability related to inter-frequency measurements.

In either of the foregoing implementations, the UE may update only the first-type UE capabilities. In the absence of different types of capabilities (as in current 3GPP specifications), the update can be for a subset of UE capabilities FIG. 10 is a call flow diagram 1000 of one implementation of providing UE capability update information involving a UE capability related to inter-frequency measurements. The UE 1002 may send an inter-frequency measurement indication on an as needed basis if the UE capability indicates no need for gaps. This indication may be sent by RRC signaling. In this case, the UE 1002 may indicate to the network 1004 that the UE needs gaps for making inter-frequency measurement for some band/channel. The message may also indicate a start/stop of measurement gaps. In one embodiment, only first-type, e.g., non-persistent, capabilities may be overridden. For example, need for gaps=0 is advertised as non-persistent capability and may be updated by measurement indication message requesting gaps. In another embodiment, in the absence of different types if capabilities (as in current 3GPP specifications), the update can be for a subset of current UE capabilities. For example, need for gaps=0 is overridden in the measurement indication message requesting gaps. The UE can piggy back this message with another message. For example, the UE can indicate need for measurement gaps in a measurement report message, e.g., for event A2 as defined in current 3GPP standards.

Figure 11:
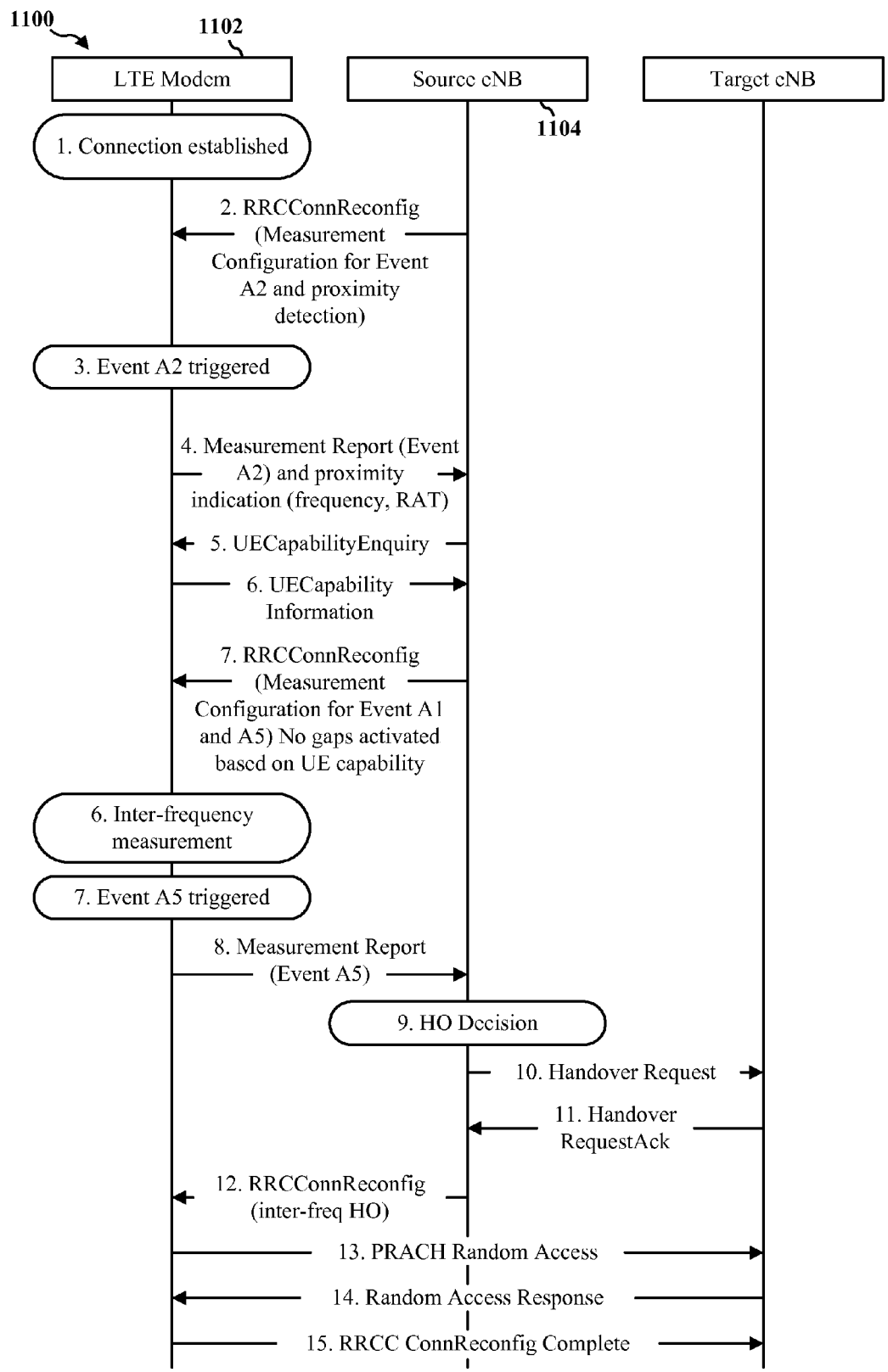
FIG. 11 is a call flow diagram of an implementation of providing UE capability update information.

FIG. 11 is a call flow diagram 1100 of a one implementation of providing UE capability update information. After connection establishment, a source eNB 1104 configures a UE 1102 for measurement event A2 (frequency F1) and proximity detection (frequency F2, RAT). The UE 1102 uses A2 event or internal-A2 event to trigger WiFi search for cells on frequency F2, where internal-A2-event is configured internally in the UE while A2 event is configured by the eNB 1104. The UE 1102 reports event A2 and proximity indication (F2, RAT). This triggers the source eNB 1104 to send UE capability enquiry message to the UE 1102. The UE 1102 sends a current UE capability information message to the source eNB 1104. This message may indicate a need for measurement gaps depending on the availability of the Wi-Fi modem. The serving eNB 1104 configures measurements on frequency F2 with or without gaps based on UE capability, whereas previously the eNB was assuming that gaps are not needed. The UE 1102 reports event A5, and the serving eNB 1104 sends a handover command.

In summary, in the above implementations, a UE may indicate that a first-type, e.g., non-persistent, capability of the UE is updated. Such indication may be provided to the eNB serving the UE by RRC or L1/L2 signaling. In one configuration, the eNB sends updated UE capability information to the MME using the UECapabilityInfoIndication message and the MME updates and stores the UE capability. The updated UE capability is downloaded to a new serving eNB when the next RRC connection is established.

In another configuration, the eNB does not send updated UE capability information to the MME. In this case, the MME maintains the type of the UE capability as the default capability type for that particular capability. For example, if a UE capability by default is a persistent capability and the capability is one of "a need for measurement gaps", then the MME considers that UE capability to be persistent and maintains it as "a need for measurement gaps", even if the UE capability has changed to one of "no need for measurement gaps". The updated UE capability, however, is used by the eNB during the current RRC connection. When a new RRC connection is established, the UE treats the relevant capability as stored in the MME as the current capability. Continuing with the previous example, if while on a current RRC connection, a UE capability has changed from one of "a need for measurement gaps" to one of a "no need for measurement gaps," and the UE changes to a new RRC connection, the UE capability will change back to one of "a need for measurement gaps", as stored in the MME.

The UE capability update mechanism disclosed also benefits multi-SIM devices. Multi-SIM devices cover scenarios where the SIMs correspond to subscriptions on different RATs on different carriers or same RATs on same/different carrier. The need for gaps (inter-frequency or inter-RAT) is determined by the availability or unavailability of a receive chain that does the measurements on the corresponding frequency and RAT.

For example, Dial SIM Dual Active (DSDA) devices can support connected states on two or more RATs/frequencies. When two or more SIMS/subscriptions are in active call, the UE will need gaps. When only one SIM/subscription is in active call, the UE does not need gaps as the unused receive chain (it may be in WWAN idle state) may be used inter-frequency/inter-RAT measurements. The above capability may be enabled by dynamic update of need for gaps.

Figure 12:
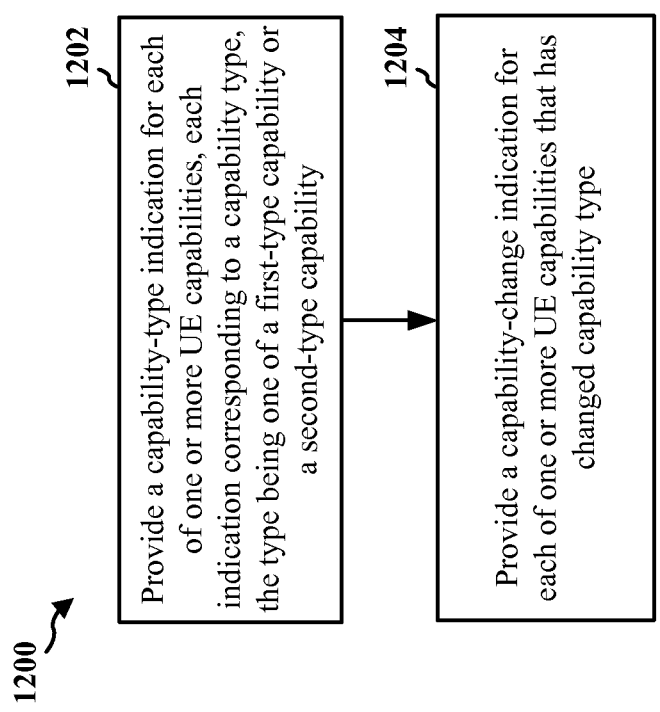
FIG. 12 is a flow chart of a method of wireless communication.

FIG. 12 is a flow chart 1200 of a method of wireless communication. The method may be performed by a UE. At step 1202, the UE provides a capability-type indication for each of one or more UE capabilities. Each indication corresponds to a capability type, the type being one of a first-type, e.g., non-persistent, capability or a second-type, e.g. persistent, capability. A capability-type indication may be provided by sending capability type information to a serving eNB associated with the UE. The capability type information may be sent by RRC signaling. In one implementation, the capability type information for first-type, e.g., non-persistent, capabilities and the capability type information for second-type, e.g., persistent, capabilities are sent in a single information element, with first-type capabilities indicated by a flag and second-type capabilities indicated by an absence of a flag. In another implementation, capability type information for first-type capabilities is sent in a first information element, and the capability type information for second-type capabilities is sent in a second information element.

At step 1204, the UE provides a capability-change indication for each of one or more UE capabilities that has changed capability type. For example, a change indication may be sent when a UE capability changes from first-type, e.g., non-persistent, to second-type, e.g., persistent. An indication of a change in a UE capability may be provided to an eNB by sending change information to the eNB by one or both of lower layer (L1/L2) signaling and RRC signaling. As noted previously, L1 is Layer 1, i.e. physical layer, and L2 is Layer 2, i.e., medium access control (MAC). In one implementation, the capability change information for first-type capabilities and the capability change information for second-type capabilities are sent in a single information element, with first-type capabilities indicated by a flag and second-type capabilities indicated by an absence of a flag. In another implementation, capability change information for first-type capabilities is sent in a first information element, and the capability change information for second-type capabilities is sent in a second information element Change information may be sent autonomously by the UE, or in response to a request for information from an eNB. A request for information from an eNB may be triggered by the UE using lower layer signaling or RRC signaling.

In one example use case, the UE may include at least two receive chains and the UE capability relates to a need for measurement gaps, or no need for measurement gaps. Here, the capability changes from a need for measurement gaps to no need for measurement gaps based on the availability of one of the at least two receive chains. For example, is a WLAN modem is available for inter-frequency measurements, then the WWAN modem would not need measurement gaps. If, however, the WLAN becomes unavailable, then measurement gaps would be needed by the WWAN to perform inter-frequency measurements.

Figure 13:
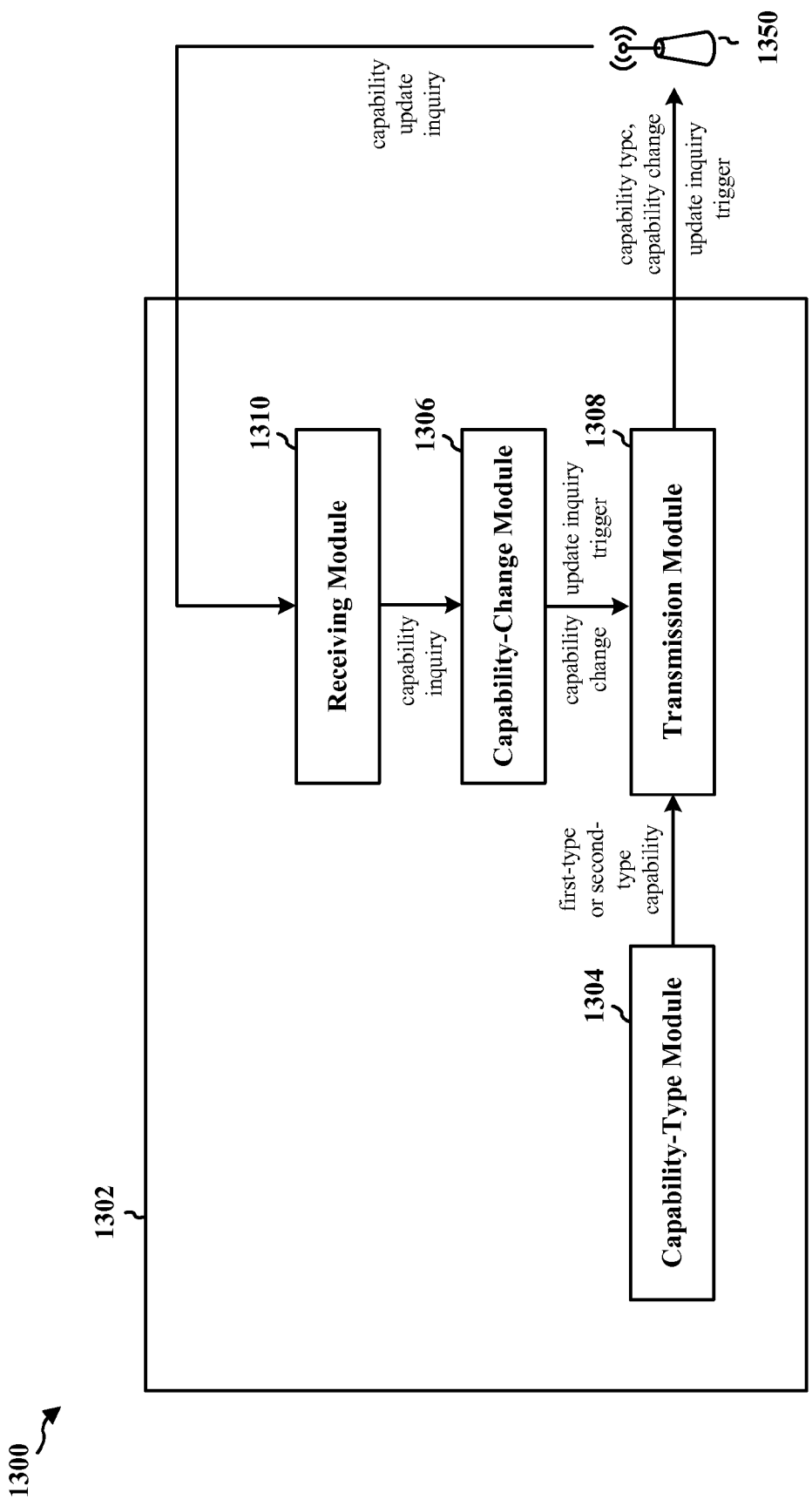
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus 1302 may be a UE. The apparatus 1302 includes a UE capability-type module 1304 that provides a capability-type indication for each of one or more UE capabilities. Each indication corresponds to a capability type, the type being one of a first-type, e.g., non-persistent, capability or a second-type, e.g., persistent capability. The capability-type module 1304 provides capability-type indications to a transmission module 1308, which in turn, sends capability type information to a serving eNB 1350 associated with the UE.

The apparatus 1302 also includes a UE capability-change module 1306 that provides a capability-change indication for each of one or more UE capabilities that has changed capability type. The capability-change module 1306 provides capability-change indications to the transmission module 1308, which in turn, sends capability change information to the serving eNB 1350 associated with the UE. The UE capability-change module 1306 may provide a capability-change indication autonomously. The UE capability-change module 1306 may also provide a capability-change indication in response to a capability update inquiry received from the eNB 1350. The capability update inquiry may be sent autonomously by the eNB 1350 or other network component. The capability update inquiry may be sent autonomously by the eNB 1350 in response to an update inquiry trigger sent by the capability-change module 1306 through the transmission module 1308.

The apparatus 1302 further includes a receiving module 1310 that receives signals from other components. For example, the a receiving module 1310 may receive capability update inquires from the eNB 1350.

The apparatus 1302 may include additional modules that perform each of the steps of the algorithm in the aforementioned call flow diagrams of FIGS. 7-11 and the flow chart of FIG. 12. As such, each step in the aforementioned call flow diagrams of FIGS. 7-11 and the flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
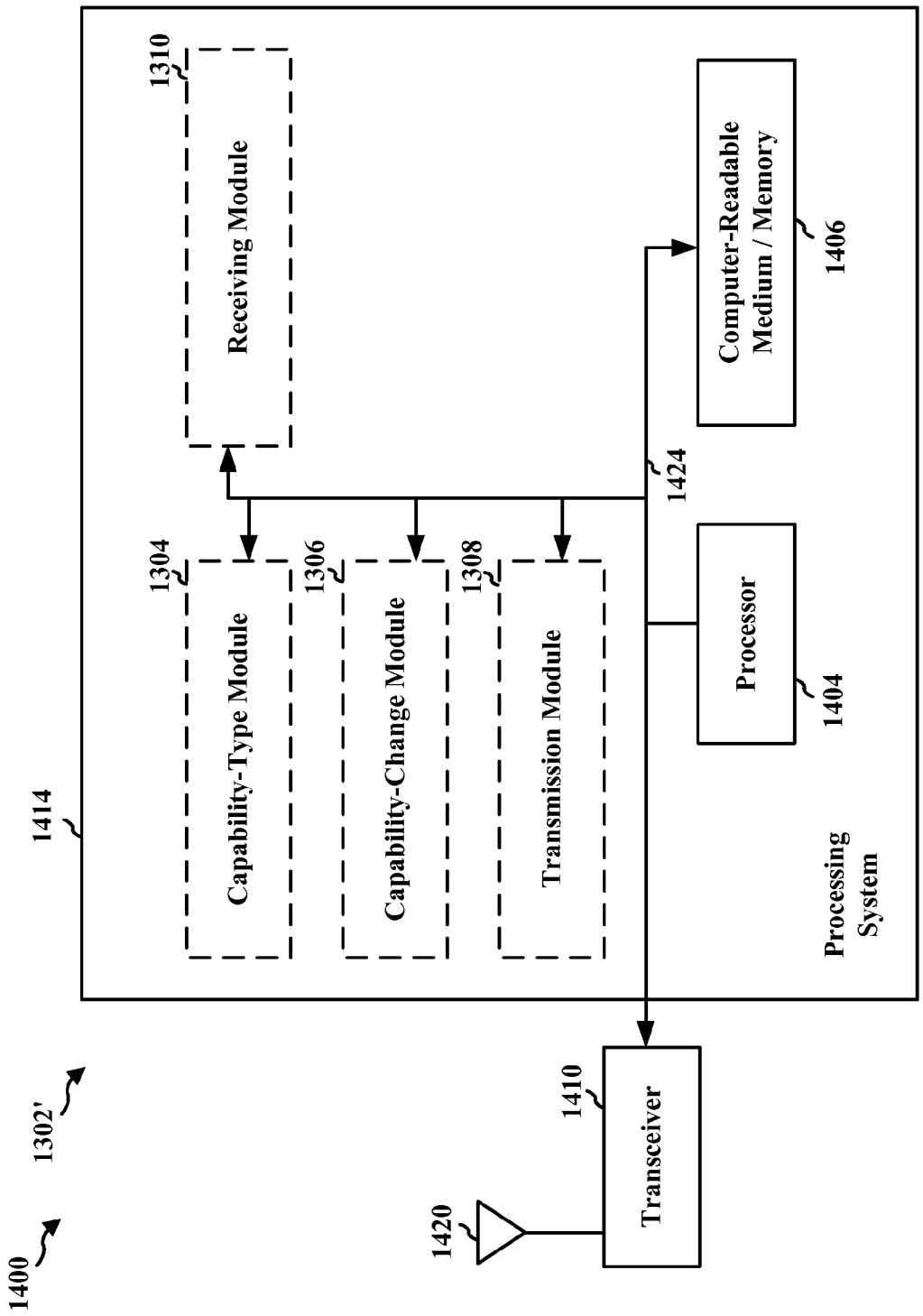
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1302, 1304, 1306, 1308 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1310. In addition, the transceiver 1410 receives information from the processing system 1414, specifically the transmission module 1308, and based on the received information, generates a signal to be applied to the one or more antennas 1420.

The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1304, 1306, 1308 and 1310. The modules may be software modules running in the processor 1404, resident/stored in the computer readable medium/memory 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for providing a capability-type indication for each of one or more UE capabilities, where each indication corresponds to a capability type, the type being one of a first-type, e.g., persistent, capability or a second-type, e.g., non-persistent, capability. The apparatus 1302/1302' also includes means for providing a capability-change indication for each of one or more UE capabilities that has changed capability type.

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In another configuration, a UE may provide a capability-change indication for each of one or more UE capabilities that has changed from a first-type capability to a second-type type, wherein the second-type capability is different from the first-type capability. Each of the one or more UE capabilities may have an associated default state or value. The UE may provide the capability-change indication to a first serving eNB. Upon handover to a second serving eNB, the UE changes the state of each of the one or more UE capabilities back to the default state associated with that capability. The UE may also, upon handover, provide information to the second serving eNB corresponding to the one or more UE capabilities. Such information may include the capability type and the default state for such capability. For example, a first-type capability may have been one of persistent with a default state of "a need for measurement gaps," While connected to the first serving eNB the capability type may have changed to a non-persistent, with a state of "no need for measurement gaps." Upon handover to the second serving eNB, the state of the UE capability will return to the default state and the UE will provide the default state to the new serving eNB.

The foregoing configuration may be implemented by the modules/means/components in the exemplary apparatus 1302 of FIG. 13 and/or the hardware implementation for the apparatus 1302' employing a processing system, as shown in FIG. 14. For example, the capability-change module 1306 of FIG. 13 may be configured to provide a capability-change indication for each of one or more UE capabilities that has changed from a first-type capability to a second-type capability, wherein the first-type capability is different from the second-type capability. Each of the one or more UE capabilities may have an associated default value, and the capability-change indication may be provided to a first serving eNB 1350. Upon handover to a second serving eNB (not shown), the capability-change module 1306 may change each of the one or more UE capabilities back to its default value. Upon handover, the capability-change module 1306 may also provide information to the second serving eNB corresponding to the default value of each of the one or more UE capabilities.

The apparatus 1302/1302' for wireless communication may include means for providing a capability-change indication for each of one or more UE capabilities that has changed from a first-type capability to a second-type capability, wherein the first-type capability is different from the second-type capability, means for changing each of the one or more UE capabilities back to the its default value upon handover to a second serving eNB, and means for providing information to the second serving eNB corresponding to the default value of each of the one or more UE capabilities. The aforementioned means may be one or more of the aforementioned modules of the apparatus 1302 and/or the processing system 1414 of the apparatus 1302' configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
providing a capability-type indication for each of a plurality of UE capabilities, each indication corresponding to a capability type, the type being one of a first-type, non-persistent capability or a second-type, persistent capability; and providing a capability-change message when a subset of the UE capabilities changes, the capability-change message comprising a capability-change indication for each of the subset of the UE capabilities that has changed, wherein the capability-change indication is provided using an established RRC connection between the UE and a serving eNB and without creating a new RRC connection, wherein the capability-change indication comprises a delta update of the subset of the UE capabilities that has changed without providing unchanged indications for unchanged UE capabilities.

2. The method of claim 1, wherein the UE is associated with a serving eNodeB (eNB) and providing a capability-type indication comprises sending capability type information to the serving eNB.

3. The method of claim 2, wherein the capability type information is sent by radio resource control (RRC) signaling.

4. The method of claim 3, wherein the capability type information for first-type capabilities and the capability type information for second-type capabilities are sent in a single information element, with first-type capabilities indicated by a flag and persistent capabilities indicated by an absence of a flag.

5. The method of claim 3, wherein capability type information for first-type capabilities is sent in a first information element, and the capability type information for second-type capabilities is sent in a second information element.

6. The method of claim 1, wherein the UE is associated with a serving eNB and providing a capability-change indication comprises sending capability change information to the serving eNB.

7. The method of claim 6, wherein the capability change information is sent by lower layer signaling.

8. The method of claim 6, wherein the capability change information is sent by RRC signaling.

9. The method of claim 6, wherein the capability change information for first-type capabilities and the capability change information for second-type capabilities are sent in a single information element, with changes in first-type capabilities indicated by a flag and changes in second-type capabilities indicated by a flag.

10. The method of claim 6, wherein capability change information for first-type capabilities is sent in a first information element, and the capability change information for second-type capabilities is sent in a second information element.

11. The method of claim 6, wherein the capability change information is sent autonomously by the UE.

12. The method of claim 6, further comprising triggering a request for the capability change information.

13. The method of claim 12, wherein the request is triggered using lower layer signaling.

14. The method of claim 1, wherein the UE comprises at least two receive chains and the capability relates to measurement gaps.

15. The method of claim 14, wherein the capability changes from a need for measurement gaps to no need for measurement gaps based on the availability of one of the at least two receive chains.

16. A user equipment (UE) for wireless communication, comprising:

means for providing a capability-type indication for each of a plurality of UE capabilities, each indication corresponding to a capability type, the type being one of a first-type, non-persistent capability or a second-type, persistent capability; and means for providing a capability-change message when a subset of the UE capabilities changes, the capability-change message comprising a capability-change indication for each of the subset of the UE capabilities that has changed, wherein the capability-change indication is provided using an established RRC connection between the UE and a serving eNB and without creating a new RRC connection, wherein the capability-change indication comprises a delta update of the subset of the UE capabilities that has changed without providing unchanged indications for unchanged UE capabilities.

17. The UE of claim 16, wherein the UE is associated with a serving eNodeB (eNB) and the means for providing a capability-type indication is configured to send capability type information to the serving eNB.

18. The UE of claim 17, wherein the capability type information is sent by radio resource control (RRC) signaling.

19. The UE of claim 18, wherein the capability type information for first-type capabilities and the capability type information for second-type capabilities are sent in a single information element, with first-type capabilities indicated by a flag and second-type capabilities indicated by an absence of a flag.

20. The UE of claim 18, wherein capability type information for first-type capabilities is sent in a first information element, and the capability type information for second-type capabilities is sent in a second information element.

21. The UE of claim 16, wherein the UE is associated with a serving eNB and the means for providing a capability-change indication is configured to send capability change information to the serving eNB.

22. The UE of claim 21, wherein the capability change information is sent by lower layer signaling.

23. The UE of claim 21, wherein the capability change information is sent by RRC signaling.

24. The UE of claim 21, wherein the capability change information for first-type capabilities and the capability change information for second-type capabilities are sent in a single information element, with changes in first-type capabilities indicated by a flag and changes in second-type capabilities indicated by a flag.

25. The UE of claim 21, wherein capability change information for first-type capabilities is sent in a first information element, and the capability change information for second-type capabilities is sent in a second information element.

26. The UE of claim 21, wherein the capability change information is sent autonomously by the UE.

27. An user equipment (UE) for wireless communication, comprising:
 a memory; and
 at least one processor coupled to the memory and configured to:
  provide a capability-type indication for each of a plurality of UE capabilities, each indication corresponding to a capability type, the type being one of a first-type, non-persistent capability or a second-type, persistent capability; and
  provide a capability-change message when a subset of the UE capabilities changes, the capability-change message comprising a capability-change indication for each of the subset of the UE capabilities that has changed, wherein the capability-change indication is provided using an established RRC connection between the UE and a serving eNB and without creating a new RRC connection, wherein the capability-change indication comprises a delta update of the subset of the UE capabilities that has changed without providing unchanged indications for unchanged UE capabilities.

28. A method of wireless communication of a user equipment (UE), comprising:
providing a capability-change message when a subset of the UE capabilities changes, the capability-change message comprising a capability-change indication for each of the subset of the UE capabilities that has changed using an established RRC connection between the UE and a serving eNB and without creating a new RRC connection, wherein the capability-change indication comprises a delta update of the subset of the UE capabilities that has changed without providing unchanged indications for unchanged UE capabilities.

29. The method of claim 28, wherein each of the one or more UE capabilities has an associated default value, and the capability-change indication is provided to a first serving eNB, and further comprising:
upon handover to a second serving eNB, changing each of the one or more UE capabilities back to its default value.

30. The method of claim 29, further comprising, upon handover, providing information to the second serving eNB corresponding to the default value of each of the one or more UE capabilities.

31. The method of claim 1, wherein the capability-change indication is provided to the serving eNB using a toggle indication.

32. An apparatus for wireless communication, comprising:
a memory; and
at least one processor coupled to the memory and configured to:
provide a capability-change message when a subset of the UE capabilities changes, the capability-change message comprising a capability-change indication for each of the subset of the UE capabilities that has changed using an established RRC connection between the UE and a serving eNB and without creating a new RRC connection, wherein the capability-change indication comprises a delta update of the subset of the UE capabilities that has changed without providing unchanged indications for unchanged UE capabilities.

33. A non-transitory computer-readable medium storing computer executable code for wireless communication of a user equipment (UE), comprising code to:
provide a capability-change message when a subset of the UE capabilities changes, the capability-change message comprising a capability-change indication for each of the subset of the UE capabilities that has changed using an established RRC connection between the UE and a serving eNB and without creating a new RRC connection, wherein the capability-change indication comprises a delta update of the subset of the UE capabilities that has changed without providing unchanged indications for unchanged UE capabilities.

34. A non-transitory computer-readable medium storing computer executable code for wireless communication of a user equipment (UE), comprising code to:
provide a capability-type indication for each of a plurality of UE capabilities, each indication corresponding to a capability type, the type being one of a first-type, non-persistent capability or a second-type, persistent capability; and
provide a capability-change message when a subset of the UE capabilities changes, the capability-change message comprising a capability-change indication for each of the subset of the UE capabilities that has changed, wherein the capability-change indication is provided using an established RRC connection between the UE and a serving eNB and without creating a new RRC connection, wherein the capability-change indication comprises a delta update of the subset of the UE capabilities that has changed without providing unchanged indications for unchanged UE capabilities.

* * * * *